United States Patent
Heinzel et al.

(10) Patent No.: US 6,209,407 B1
(45) Date of Patent: Apr. 3, 2001

(54) TOOTHED GEAR TRANSMISSION HAVING TWO PARTIAL TRANSMISSIONS DISPOSED PARALLEL TO EACH OTHER IN THE POWER FLOW

(75) Inventors: Markus Heinzel, Donzdorf; Ralf Sperber, Wendlingen; Günter Wörner, Kernen, all of (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 09/472,347

(22) Filed: Dec. 27, 1999

(30) Foreign Application Priority Data

Dec. 24, 1998 (DE) .............................. 198 60 251
May 20, 1999 (DE) .............................. 199 23 185

(51) Int. Cl.[7] ............................................ F16H 3/08
(52) U.S. Cl. ................................................... 74/331
(58) Field of Search ........................................ 74/331

(56) References Cited

U.S. PATENT DOCUMENTS 2,599,801 * 6/1952 Youngren et al. ................ 74/331
2,658,405 * 11/1953 Dodge ............................... 74/331
4,658,663   4/1987 Hiraiwa .
4,823,628   4/1989 Hiraiwa .

* cited by examiner

Primary Examiner—Dirk Wright
(74) Attorney, Agent, or Firm—Kenyon & Kenyon

(57) ABSTRACT

A toothed gear transmission is described, in which an input shaft is connected to a differential by a first and a second partial transmission, which are disposed parallel to each other in the power flow and which both have a frictionally engaged load shifting clutch and an intermediate shaft. The elements are disposed concentrically to each other and coaxially to the input shaft, and each intermediate shaft can be effectively connected to the input shaft through the load shifting clutch. At least one toothed gear for each intermediate shaft is provided, of which at least one can be effectively connected to a first driven shaft disposed parallel to the intermediate shafts, which directly or indirectly outputs to the differential gear.

13 Claims, 4 Drawing Sheets

TOOTHED GEAR TRANSMISSION HAVING TWO PARTIAL TRANSMISSIONS DISPOSED PARALLEL TO EACH OTHER IN THE POWER FLOW

The invention relates to a toothed gear transmission having two partial transmissions disposed parallel to each other in the power flow, and in particular to a toothed gear transmission in which an input shaft is connected to a differential by first and second partial transmissions disposed parallel to each other in the power flow and both having a frictionally engaged load shifting clutch.

DESCRIPTION OF RELATED ART

The manual transmissions with a friction clutch which are normally used in motor vehicles are simple and sturdy, but they have the disadvantage that an interruption in power delivery to the wheels occurs during gear changes. Conventional automatic transmissions with torque converters avoid an interruption of power delivery during gear changes, but due to the torque converter they are less efficient than manual transmissions. Moreover, they are heavier and more costly.

Using toothed gear transmissions having two frictionally engaged load shifting clutches and two partial transmissions disposed parallel to each other in the power flow, it is possible to change gears under load, which is done with an overlap control of the load shifting clutches. This makes it possible to obtain an inexpensive automatic transmission having good efficiency. Generally speaking, the even gear speeds are allocated to one partial transmission and the odd gear speeds are allocated to the other partial transmission.

With this system, shifting is done sequentially under load, and individual gear speeds cannot be skipped without further action, for example a double upshifting or double downshifting.

A toothed gear transmission is described in U.S. Pat. No. 4,658,663, in which an input shaft is connected to an output shaft through first and second partial transmissions disposed parallel to each other in the power flow, and both having a frictionally engaged load shifting clutch. The load shifting clutches can be used to connect concentrically arranged intermediate shafts of the partial transmissions with the input shaft. The intermediate shafts can be effectively connected with the output shaft through transmission constants, through a joint counter shaft disposed parallel to the input shaft, and through toothed gear pairs. The toothed gear pairs for the forward gear speeds I, III, and IV, as well as the toothed gear pair for the reverse gear speed, are located in the first partial transmission. The fourth gear speed is a direct gear speed and can be selected by engaging a shifting element between the output shaft and the intermediate shaft of the first partial transmission.

The second partial transmission includes the toothed gear pairs of forward gear speeds II and V, as well as an additional toothed gear pair, whose gear ratio is equal to that of the third gear speed, whose toothed gear pair belongs to the first partial transmission. In the first partial transmission, a toothed gear clutch for the third gear speed and the direct clutch for the fourth gear speed are combined into a change clutch having a joint synchronizer sleeve, which can be coupled with an idler gear of the toothed gear pair for the third gear speed or with the output shaft.

Double upshifts and double downshifts are possible without interruption of the torque transfer in the described toothed gear transmission, but shifting from the direct fourth gear speed to the first and third gear speeds, whose toothed gear pairs also belong to the first partial transmission, requires intermediate engagement of the supplemental toothed gear pair of the third gear speed. Moreover, a total of seven toothed gear pairs are disposed along the common counter shaft, causing the toothed gear transmission to be relatively long. In addition, the first load shifting clutch of the first partial transmission is always used to start from the first gear speed, which causes greater wear to occur on it than on the second load shifting clutch.

SUMMARY OF THE INVENTION

The invention is a toothed gear transmission easy to construct and having a shortened length, low weight, and high efficiency.

In one embodiment, the invention is a toothed gear transmission with an input shaft connected to a differential by a first and a second partial transmission disposed parallel to each other, which includes two frictionally engaged load shifting clutches coupled respectively to the first and second partial transmissions, two intermediate shafts disposed concentrically to each other and coaxially to the input shaft, each of the intermediate shafts being connectable to the input shaft through one of the load shifting clutches, and at least one toothed gear on each of the two intermediate shafts, the at least one toothed gear being connectable with a first driven shaft disposed parallel to the two intermediate shafts, said first driven shaft providing power to a differential. The invention also includes at least one second driven shaft, parallel to the first driven shaft, having an axis distance between said at least one second driven shaft and one of the two intermediate shafts and the differential that is unequal from a second axis distance between the first driven shaft and one of the two intermediate shafts and the differential. In the invention, one of the at least one toothed gear on each of the two intermediate shafts meshes with a corresponding toothed gear disposed on the first driven shaft and with a toothed gear disposed on at least one of the second driven shafts.

The invention is based on a toothed gear transmission in which an input shaft is connected to a differential by a first and a second partial transmission, which are disposed parallel to each other in the power flow. Each partial transmission has a frictionally engaged load shifting clutch and an intermediate shaft, which are disposed concentrically to each other and coaxially to the input shaft. The respective intermediate shaft can be effectively connected to the input shaft through the load shifting clutch. Each intermediate shaft has at least one toothed gear. At least one intermediate shaft can be effectively connected to a driven shaft, or transmission output shaft, disposed parallel to the intermediate shafts. The driven shaft directly or indirectly drives the differential gear, for example indirectly through a supplemental shaft, a lateral shaft, or a lateral stage. However, it is particularly advantageous for the driven shaft to directly drive a toothed gear of the differential gear, which allows a more compact design and higher efficiency of output, through fewer toothed gear engagements. The differential can be designed as a separate unit or as an integral part of the transmission.

At least one second driven shaft is disposed parallel to the first driven shaft, at an axis distance from the intermediate shafts or the differential that is unequal from the axis distance of the first driven shaft. A minimum of one toothed gear of at least one intermediate shaft meshes both with one toothed gear on the first driven shaft and with one toothed gear on the second driven shaft.

At least one toothed gear, but more advantageously a plurality of toothed gears, are disposed on one or both intermediate shafts, and can be allocated to two gear speeds. With more than two driven shafts, the toothed gears can also be allocated to more than two gear speeds. While allowing a short construction length due to few toothed gear planes, a high number of load shifting capabilities can be achieved by the present transmission. In particular, sequential shifting, double upshifts and double downshifts under load can be achieved, without requiring additional toothed gear planes. Construction space, weight, and cost can be reduced and efficiency can be increased by utilizing the present design. Based on the short construction length that can be achieved, the toothed gear transmission in accordance with the invention is particularly appropriate for transverse installation into a front wheel drive motor vehicle. However, it is also appropriate for longitudinal installation into any type of motor vehicle.

For example, the first and second gear speeds can be placed on a common driven shaft, so that during a gear change from the first to the second gear speed output is possible through the common driven shaft. Changing driven shafts can be avoided, thereby increasing comfort when changing gears from the first to the second gear speed, which usually occurs under load.

In an advantageous embodiment usable in a broad range of applications, one toothed gear plane with three toothed gears is allocated to the second and fourth gear speeds, and one toothed gear plane is allocated to the third and sixth gear speeds. the ratio and axis distances of the driven shafts to the intermediate shafts or to the differential gear is determined by a progressive ratio from the second to the fourth gear speed, which corresponds to the progressive ratio from the third to the sixth gear speed. However, the axis distances can also be oriented according to other progressive ratios, for example according to the progressive ratio from the first to the second gear speed or from the a second to the third gear speed.

In the present design, one driven shaft is advantageously allocated to the fourth, the fifth, and the sixth gear speeds, and one driven shaft is advantageously allocated to the first, the second, and the third gear speeds, as well as the reverse gear speed. The toothed gear plane for the third and sixth gear speeds, one toothed gear plane for the first gear speed, and one toothed gear plane for the fourth gear speed each have one toothed gear on one intermediate shaft. The toothed gear plane for the second and fourth gear speed, one toothed gear plane for the fifth gear speed, and one toothed gear plane for the reverse gear speed each have one toothed gear on the other intermediate shaft.

To additionally reduce the axial dimensions, a maximum of two toothed gears on each intermediate shaft is used. One driven shaft is thus advantageously allocated to the second, the third, the fifth gear speeds and the reverse gear speed. One other driven shaft is advantageously allocated to the first, the fourth, and the sixth gear speeds. The toothed gear plane for the third and sixth gear speeds, one toothed gear plane for the reverse gear speed and the first gear speed each have one toothed gear on one intermediate shaft, while the toothed gear plane for the second, the fourth gear speeds and one toothed gear plane for the fifth gear speed each have one toothed gear on the other intermediate shaft.

A minimum of one toothed gear on at least one intermediate shaft can be placed in effective connection with the first and second load shifting clutches. According to the invention, it is possible to achieve a particularly high number of load shifting capabilities with few toothed gear planes, and in particular to achieve sequential shifting, double upshifts and double downshifts under load without additional toothed gear planes. Construction space, weight, and cost can accordingly be reduced, and efficiency can be increased.

In another embodiment, at least one toothed gear on one intermediate shaft can be placed in effective connection with the first and the second load shifting clutches. It is particularly advantageous to place one intermediate shaft in direct or indirect effective connection with the other intermediate shaft through one or more shifting elements. A plurality of toothed gears can then be effectively connected to both load shifting clutches by one or at least by a small number of shifting elements.

The toothed gear allocated to the first gear speed can be advantageously placed in effective connection with the first and second load shifting clutches, making it possible to choose to use the first, the second, or both load shifting clutches for starting. The resulting stress from the starting process can be distributed to both load shifting clutches. Excessive temperatures can be avoided even if the components are not oversized, so that wear can be reduced, and maintenance intervals can be extended. Moreover, if one load shifting clutch fails, the second load shifting clutch can be used to start from the first gear speed, increasing mobility of the vehicle.

The load shifting clutches can also be constructed differently for various starting processes, and can be used individually or together for starting from a higher gear speed. The load shifting clutches are advantageously used together or individually for starting as a function of at least one operating parameter, for example as a function of a load, friction, temperature, or wear applied on the load shifting clutches.

In an advantageous embodiment for a broad range of applications, one toothed gear plane is allocated to the third and fourth gear speeds and one toothed gear of the toothed gear plane, which is supported on the intermediate shaft, can be placed in effective connection with the first and the second load shifting clutches. In this embodiment, one driven shaft is advantageously allocated to the first, the second, the fourth, and the sixth gear speeds, and the other driven shaft is advantageously allocated to the third, the fourth, and the fifth gear speeds, as well as the reverse gear speed. One toothed gear plane for the fourth and sixth gear speeds and one toothed gear plane for the reverse gear speed and the second gear speed each have one toothed gear on one intermediate shaft. One toothed gear plane for the third and fourth gear speeds, one toothed gear plane for the first gear speed, and one toothed gear plane for the fifth gear speed each have one toothed gear on the other intermediate shaft.

BRIEF DESCRIPTION OF THE DRAWINGS

Additional advantages can be found in the following description of the drawings. The drawings show exemplary embodiments of the invention. Those skilled in the art will also find it beneficial to consider the features described herein individually and to combine them into useful additional combinations.

In the drawings.

DETAILED DESCRIPTION OF PREFERRED EMBODIMENTS OF THE INVENTION

Figure 1:
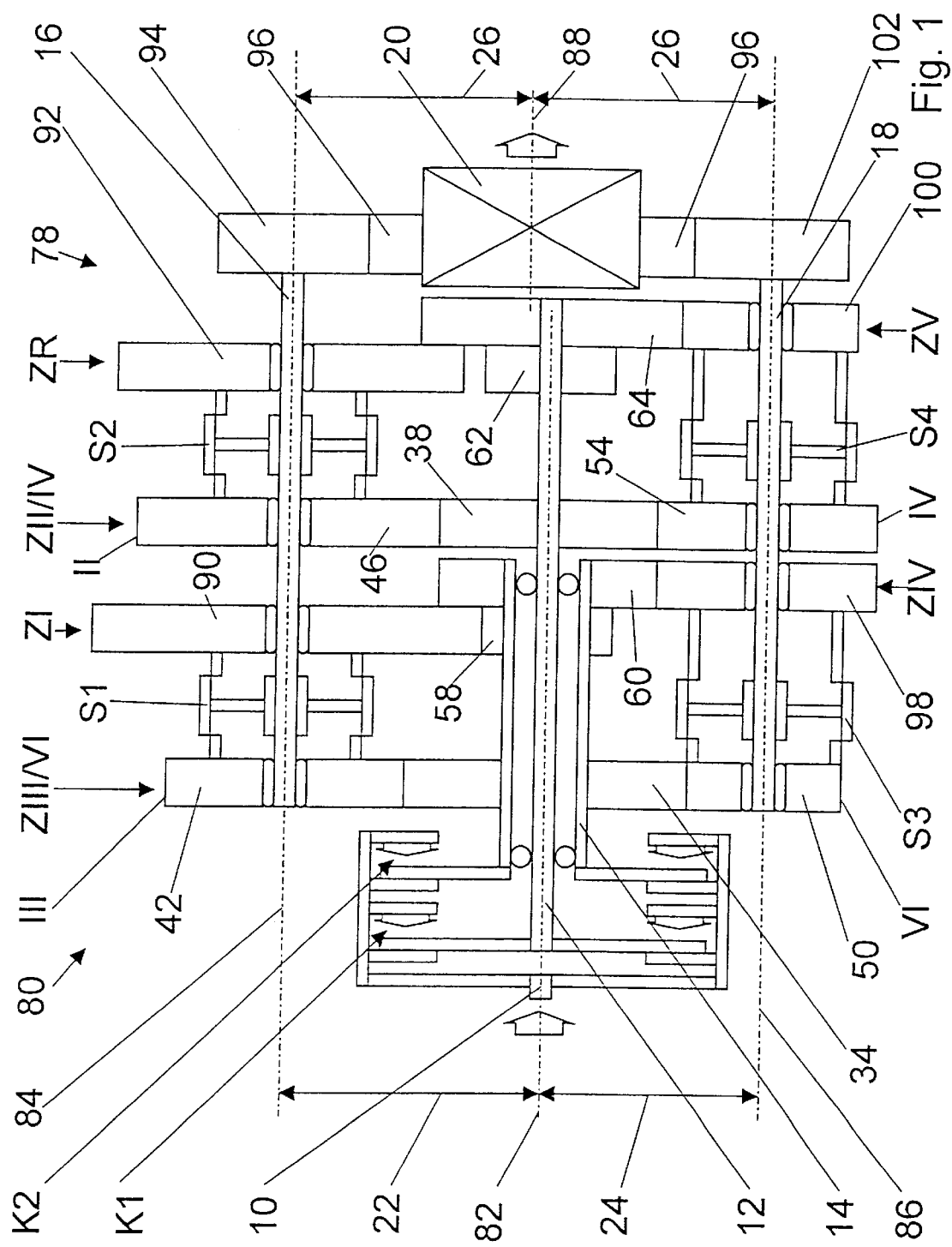
FIG. 1 is a schematic representation of a toothed gear transmission, in which two driven shafts have different axis distances to two intermediate shafts.

FIG. 1 shows a toothed gear transmission in which one input shaft 10 having a differential gear 20 is connected by a first and a second partial transmission 78, 80, which are disposed parallel to each other in the power flow. Each partial transmission 78, 80 has one frictionally engaged load shifting clutch K1, K2 and one intermediate shaft 12, 14, which are disposed concentrically to each other and coaxially to input shaft 10. Each intermediate shaft 12, 14 can be effectively connected to input shaft 10 through load shifting clutch K1, K2. Each intermediate shaft 12, 14 has three fixed gears supported on it, labeled 34, 58, 60, 38, 62, 64.

Figure 4:
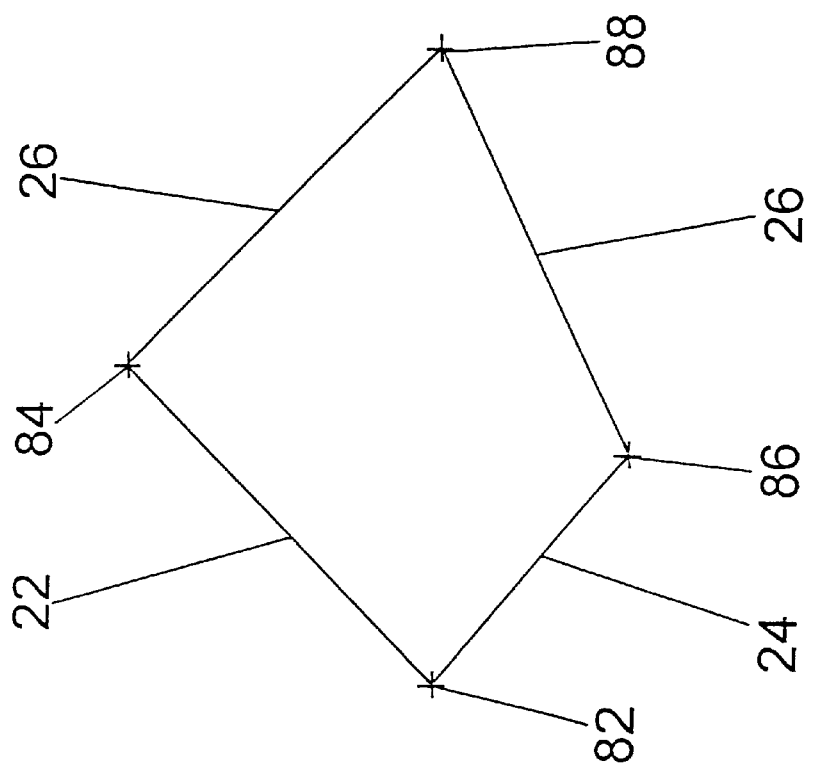
FIG. 4 shows a schematic lateral view of the toothed gear transmission shown in FIG. 1.

In accordance with the invention, in addition to a first driven shaft 16 which is disposed parallel to the intermediate shafts 12, 14, there is a second parallel driven shaft 18. The second driven shaft 18 has, starting from its center axis 86, an axis distance 24 to the center axis 82 of input shaft 10 and of intermediate shafts 12, 14. This axis distance 24 is smaller than the axis distance 22 starting from the center axis 84 of first driven shaft 16 to center axis 82 (FIGS. 1 and 4). FIG. 4 shows a schematic lateral view of the center axes 82, 84, 86 and the axis distances 22, 24. Center axes 84, 86 of driven shafts 16, 18 have the same axis distance 26 to the center axis 88 of differential 20.

Fixed gear 34 on intermediate shaft 14 meshes both with an idler gear 42 supported concentrically, so that it can rotate on first driven shaft 16, and with an idler gear 50 supported concentrically, so that it can rotate on second driven shaft 18. Moreover, fixed gear 38 on intermediate shaft 12 meshes both with an idler gear 46 supported concentrically to rotate on first driven shaft 16 and with an idler gear 54 supported concentrically to rotate on second driven shaft 18. Due to the different axis distances 22, 24, one toothed gear plane ZIII/VI with fixed gear 34 and idler gears 42, 50 and one toothed gear plane ZII/ZIV with fixed gear 38 and idler gears 46, 54 can each be allocated to two gear speeds III, VI, II, IV.

Figure 5:
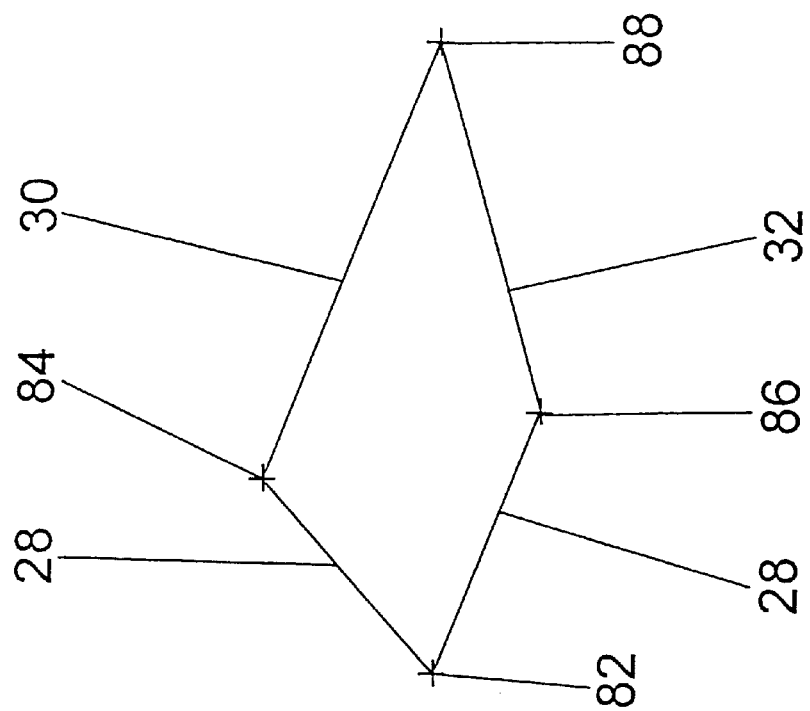
FIG. 5 shows a schematic lateral view of another embodiment according to the invention.

A sample embodiment in FIG. 5 shows the toothed gear transmission shown in FIG. 1 with changed axis distances 28, 30, 32. Driven shafts 16, 18 have, starting from their center axes 84, 86, the same axis distance 28 to center axis 82 of input shaft 10 and intermediate shafts 12, 14. Driven shafts 16, 18 have different axis distances 30, 32 to the center axis 88 of differential 20. Axis distances 30, 32 are selected in such a way that, as shown in the sample embodiment in FIG. 1, there is one progressive ratio in toothed gear plane ZII/IV from the second to the fourth gear speed II–IV which corresponds to a progressive ratio from the third to the sixth gear speed III–VI, to which is allocated toothed gear plane ZIII/VI.

In addition to the sample embodments shown, additional different embodiments can be made by those skilled in the art. For example, embodiments in which driven shafts 16, 18 have different axis distances to the center axis 82 of input shaft 10 and intermediate axes 12, 14 and to the center axis 88 of differential 20 can be made according to the invention.

In addition to idler gear 42, driven shaft 16 can have three other idler gears 90, 46, 92 concentrically arranged on it so that they can rotate, and one fixed gear 94 concentrically arranged on it so that it cannot rotate.

Idler gear 42 meshes in toothed gear plane ZIII/VI with fixed gear 34 that is supported on intermediate shaft 14, and is allocated to third gear speed III. Idler gear 90 meshes in a toothed gear plane ZI with fixed gear 58, supported on intermediate shaft 14, and is allocated to first gear speed I. Idler gears 42, 90 have a toothed gear clutch S1 arranged between them, which in third gear speed III couples idler gear 42, and in first gear speed I connects idler gear 90 to driven shaft 16.

Idler gear 46 meshes in toothed gear plane ZII/IV with fixed gear 38, supported on intermediate shaft 12, and is allocated to second gear speed II. Idler gear 92, allocated to reverse gear speed R, meshes in a toothed gear plane ZR with a toothed gear for reversal of the direction of rotation, and is not shown in detail in the drawing. Idler gear 92 in turn meshes with fixed gear 62 on intermediate shaft 12. Idler gears 46, 92 have a toothed gear clutch S2 arranged between them, which in second gear speed II couples idler gear 46 and in reverse gear speed R couples idler gear 92 to driven shaft 16.

Fixed gear 94 outputs directly in a fixed gear ratio to toothed gear 96 of differential 20. The first and second gear speeds I, II are disposed on driven shaft 16. During a gear change from first to second gear speed I–II, output always takes place through driven shaft 16. Changing driven shafts 16, 18 is avoided, and greater shifting comfort can be achieved.

In addition to idler gear 50, driven shaft 18 has three additional idler gears 98, 54, 100 concentrically arranged on it so that they can rotate, and one fixed gear 102 concentrically arranged on it so that it cannot rotate. Idler gear 50 meshes in toothed gear plane ZIII/VI with fixed gear 34 supported on intermediate shaft 14, and is allocated to sixth gear speed VI. Idler gear 98 meshes in a toothed gear plane ZIV with fixed gear 60 supported on intermediate shaft 14, and is allocated to fourth gear speed IV. Idler gears 50, 98 have a toothed gear clutch S3 arranged between them, which in sixth gear speed VI couples idler gear 50 and in fourth gear speed IV couples idler gear 98 to driven shaft 18.

Idler gear 54 meshes in toothed gear plane ZII/IV with fixed gear 38 supported on intermediate shaft 12, and is allocated to fourth gear speed IV. Idler gear 100 meshes in a toothed gear plane ZV with fixed gear 64 supported on intermediate shaft 12, and is allocated to fifth gear speed V. Idler gears 54, 100 have a toothed gear clutch S4 arranged between them, which in fourth gear speed IV couples idler gear 54 and in fifth gear speed V couples idler gear 100 to driven shaft 18. Fixed gear 102 outputs directly and with a fixed gear ratio to toothed gear 96 of differential 20.

Sequential upshift from first gear speed I to fourth gear speed IV is possible under load by means of an overlap control of the two load shifting clutches K1, K2. Overlap control should always be understood to mean control of the transfer capability of both load shifting clutches KN, K2, in which the sum of the transfer capabilities is kept approximately constant and the transfer capability of the disengaging load shifting clutch approaches zero.

After upshifting from third to fourth gear speed III–IV, the power flow in fourth gear speed IV runs from input shaft 10 through first load shifting clutch K1, to intermediate shaft 12, fixed gear 38, idler gear 54, toothed gear clutch S4, driven shaft 18, and through fixed gear 102 to differential 20. To shift up from fourth to fifth gear speed IV–V, idler gear 98 of toothed gear plane ZIV is coupled by toothed gear clutch S3 to driven shaft 18. An overlap control from first load shifting clutch K1 to second load shifting clutch K2, makes a shift take place from fourth gear speed IV in toothed gear plane ZII–IV to fourth gear speed IV in toothed gear plane ZIV, under load. The power flow then runs from input shaft 10 through second load shifting clutch K2, intermediate shaft 14, fixed gear 60, idler gear 98, toothed gear clutch S3, driven shaft 18, and through fixed gear 102 to differential gear 20.

Sequential upshift from fourth gear speed IV in toothed gear plane ZIV to fifth and from fifth to sixth gear speed VI is possible under load by means of an overlap control of the two load shifting clutches K1, K2. Sequential downshifting under load is possible from sixth gear speed VI to first gear speed I, corresponding to the upshift sequence.

It is also possible to shift under load from gear speed II into fourth gear speed IV, in toothed gear plane ZIV, by an overlap control of first load shifting clutch K1 to second load shifting clutch K2. It is correspondingly possible to downshift under load from fourth gear speed IV to second gear speed II. Moreover, double upshifting and double downshifting under load between third and fifth gear speeds III–V and between fourth gear speed IV in toothed gear plane ZII–IV and sixth gear speed VI is possible by an overlap control of load shifting clutches K1, K2. In the toothed gear transmission, all gear speeds I–VI can be sequentially shifted under load by an overlap control. Moreover, the most important double upshifts and double downshifts, which are particularly necessary before and after a passing maneuver, can be done under load by an overlap control of load shifting clutches K1, K2.

Figure 2:
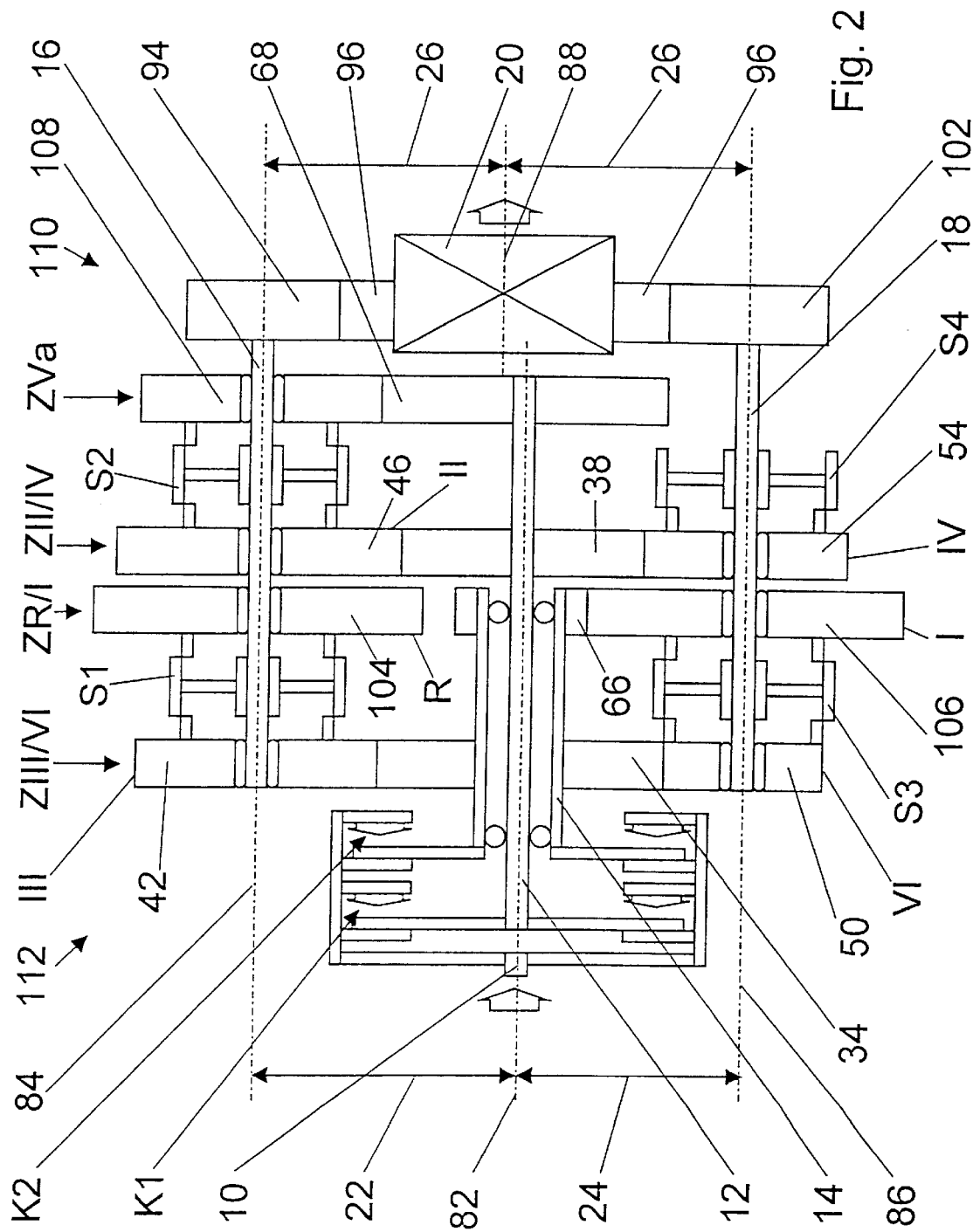
FIG. 2 is a schematic representation of a second embodiment according to the invention, having four toothed gear planes.

FIG. 2 shows a variant according to the invention of the device shown in FIG. 1, in which input shaft 10 is connected to differential gear 20 by a first and a second partial transmission 110, 112, which are disposed parallel to each other in the power flow. Parts that remain substantially the same are always numbered with the same reference numbers. The characteristic features of the sample embodiment in FIG. 2 are described in greater detail below, in comparison with the sample embodiment in FIG. 1. With regard to details and functions that remain the same, reference may be made to the description of the sample embodiment in FIG. 1.

Each intermediate shaft of the toothed gear transmission has only two fixed gears 34, 66, 38 and 68, supported concentrically on it so that they cannot rotate. Instead of toothed gear planes ZI, ZIV, ZR, ZV of the sample embodiment in FIG. 1, the toothed gear transmission in FIG. 2 has, in addition to toothed gear planes ZIII/VI and ZII/IV, toothed gear planes ZR/I and ZVa, resulting therefore in two fewer toothed gear planes than the toothed gear transmission in FIG. 1. The toothed gear transmission in FIG. 2 can therefore be constructed to be particularly short, light, and inexpensive.

Fixed gear 66 supported on intermediate shaft 14 meshes with a toothed gear for reversal of the direction of rotation (not shown in the drawings), in toothed gear plane ZR/I, which is disposed between toothed gear planes ZIII/VI and ZII/IV. In turn, the reversal gear meshes with a concentric idler gear 104 mounted so that it can rotate on driven shaft 16. Idler gear 104 is allocated to rear gear speed R and can be coupled to driven shaft 16 by toothed gear clutch Sl. Moreover, fixed gear 66 in toothed gear plane ZR/I meshes with an idler gear 106 concentrically mounted on driven shaft 18, so that it can rotate. Idler gear 106 allocated to first gear speed I can be coupled by toothed gear clutch S3 to driven shaft 18.

In toothed gear plane ZVa, which is disposed between toothed gear plane ZII/IV and fixed gears 94, 102, fixed gear 68 supported on intermediate shaft 12 meshes with idler gear 108 concentrically mounted on driven shaft 16, so that it can rotate. Idler gear 108 allocated to fifth gear speed V can be coupled by toothed gear clutch S2 to driven shaft 16.

Sequential upshift from first to fourth gear speed I–IV is possible under load by means of an overlap control of the two load shifting clutches K1, K2. It is also possible to shift under load from fourth to fifth gear speed IV–V, either with interruption of load or, advantageously, by intermediate shifting of sixth gear speed VI through load shifting clutch K2 to produce a filling torque. The gear change from fifth gear speed V into sixth gear speed VI is in turn possible by an overlap control of load shifting clutches K1, K2. Corresponding to sequentially upshifting from first to sixth gear speed I–VI, it is possible to downshift sequentially under load from sixth to first gear speed VI–I.

It is particularly advantageous, in the toothed gear transmission having only four toothed gear planes ZIII/VI, ZR/I, ZII/IV, ZVa, for the double upshifting and double downshifting under load between third and the fifth gear speeds III–V and between the fourth and the sixth gear speeds IV–VI, to be done by an overlap control of load shifting clutches K1, K2. In particular, before a passing maneuver, it is possible to downshift very quickly under load, without intermediate shifting of a gear speed and/or a filling torque, from fifth into third gear speed V–III, or from sixth into fourth gear speed VI–IV.

Figure 3:
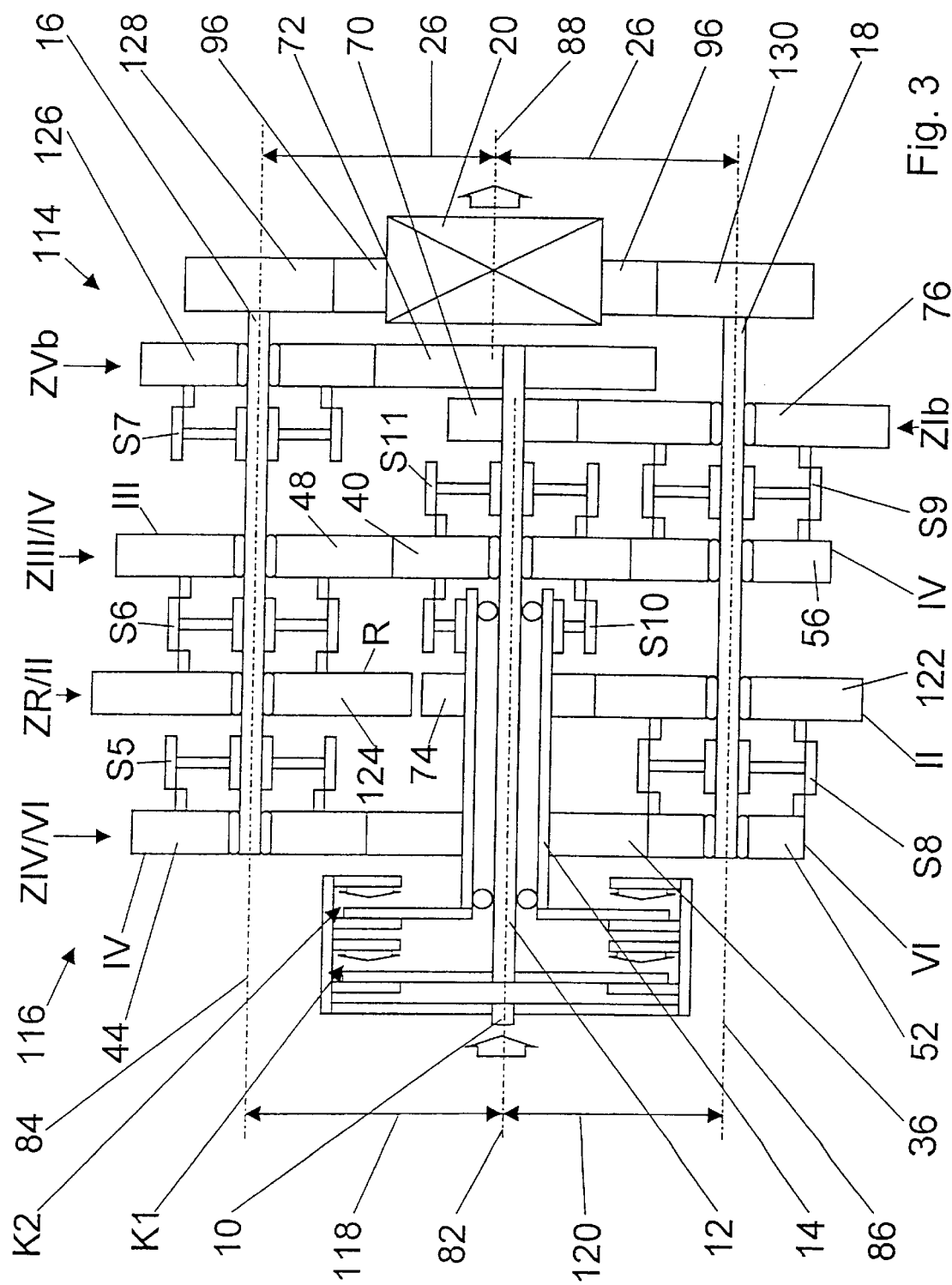
FIG. 3 is a schematic representation of a third embodiment according to the invention, in which two intermediate shafts can be connected through shifting elements.

FIG. 3 shows a variant of the device shown in FIG. 1, in which input shaft 10 is coupled to differential 20 by a first and a second partial transmission 114, 116, which are disposed parallel to each other in the power flow. Parts that remain substantially the same are always numbered with the same reference numbers. The characteristic features of the sample embodiment in FIG. 3 are described in greater detail below, in comparison with the sample embodiment in FIG. 1. With regard to details and functions that remain the same, reference may be made to the description of the sample embodiment in FIG. 1.

Intermediate shaft 14 has two fixed gears 36, 74 supported concentrically on it so that they cannot rotate, and intermediate shaft 12 has one idler gear 40 supported concentrically on it so that it can rotate. Two fixed gears 70, 72 are supported concentrically on shaft 14 so that they cannot rotate.

Second driven shaft 18 has, starting from its center axis 86, an axis distance 120 to center axis 82 of input shaft 10 and of intermediate shafts 12, 14 which is smaller than the axis distance 118 starting from center axis 84 of first driven shaft 16 to center axis 82.

Fixed gear 36 on intermediate shaft 14 meshes both with an idler gear 44 concentrically supported on first driven shaft 16, so that it can rotate, and with an idler gear 52 concentrically supported on second driven shaft 18, so that it can rotate. Idler gear 74 meshes with an idler gear 122 concentrically supported on driven shaft 18, so that it can rotate, and with a toothed gear for reversal of the direction of rotation, not shown in the drawings, which in turn meshes with an idler gear 124 concentrically supported on driven shaft 16, so that it can rotate. Moreover, idler gear 40 on intermediate shaft 12 meshes both with an idler gear 48 concentrically supported on first driven shaft 16, So that it can rotate, and with an idler gear 56 concentrically supported on second driven shaft 18, so that it can rotate. Due to the different axis distances 118, 120, one toothed gear plane ZIV/VI with fixed gear 36 and idler gears 44, 52, one toothed gear plane ZR/II with fixed gear 74 and idler gears 122, 124, and one toothed gear plane ZIII/IV with idler gears 40, 48, 56 can each be allocated to two gear speeds IV, VI, R. II, III, IV.

Axis distances 118, 120 are selected in such a way that there is a progressive ratio in toothed gear plane ZIII/IV from third to fourth gear speed III–IV, which corresponds to a progressive ratio from fourth to sixth gear speed IV–VI, to which toothed gear plane ZIV/VI is allocated. Driven shaft 16 supports, in addition to idler gear 44, another three idler gears 124, 48, 126, which are concentrically supported so that they can rotate, and one fixed gear 128, which is concentrically supported so that it cannot rotate. Idler gear 44 disposed in toothed gear plane ZIV/VI is allocated to fourth gear speed IV, and can be coupled with a toothed gear clutch S5 to driven shaft 16.

Idler gear 124, disposed in toothed gear plane ZR/II, is allocated to reverse gear speed R. Idler gear 48, disposed in toothed gear plane ZIII/IV, is allocated to third gear speed III. Idler gears 124 and 48A have a toothed gear clutch S6 arranged between them, which in reverse gear speed R couples idler gear 124, and in third gear speed III couples idler gear 48 to driven shaft 16.

Idler gear 126 meshes in a toothed gear plane ZVb with fixed gear 72 on intermediate shaft 12, is allocated to fifth gear speed V, and can be coupled with a toothed gear clutch S7 to driven shaft 16. Fixed gear 128 outputs directly and with a fixed gear ratio to toothed gear 96 of differential 20.

Driven shaft 18 has arranged on it, in addition to idler gear 52, three other idler gears 122, 56, 76, which are concentrically supported so that they can rotate, and a fixed gear 130, which is concentrically supported so that it cannot rotate. Idler gear 52, disposed in toothed gear plane ZIV/VI, is allocated to sixth gear speed VI. Idler gear 122, disposed in toothed gear plane ZR/II, is allocated to second gear speed II. Idler gears 52, 122 have a toothed gear clutch S8 arranged between them, which in sixth gear speed VI couples idler gear 52, and in second gear speed II couples idler gear 122 to driven shaft 18.

Idler gear 56, disposed in toothed gear plane ZIII/IV, is allocated to fourth gear speed IV. Idler gear 76 meshes in a toothed gear plane ZIb with fixed gear 70 supported on intermediate shaft 12, and is allocated to first gear speed I. Idler gears 56, 76 have a toothed gear clutch S9 arranged between them, which in fourth gear speed IV couples idler gear 56, and in first gear speed I couples idler gear 76 to driven shaft 18. Fixed gear 130 outputs directly and with a fixed gear ratio to toothed gear 96 of differential 20.

First and second gear speeds I, II are disposed on driven shaft 18. During a gear change from first into second gear speed I–II, output always takes place through driven shaft 18. Changing driven shafts 16, 18 is avoided, and greater shifting comfort can be achieved.

In the exemplary embodiment shown in FIG. 3 according to the invention, it is possible to bring toothed gears 36, 74, 40, 70, 72 on intermediate shafts 12, 14 into effective connection with first and second load shifting clutches K1, K2, in addition to those connections that are shown in the exemplary embodiments shown and described with reference to FIG. 1 and FIG. 2.

Idler gear 40 supported in toothed gear plane ZIII/IV, on intermediate shaft 12, can be coupled with a toothed gear clutch S10 to intermediate shaft 14, and placed into effective connection with load shifting clutch K2. Moreover, idler gear 40 can be coupled to intermediate shaft 12 with a toothed wheel clutch S11, and placed into effective connection with load shifting clutch K1. It is also possible to output power through the idler gear 48 allocated to third gear speed III, and through the idler gear 56 allocated to fourth gear speed IV, both with closed load shifting clutch K1 and with closed load shifting clutch K2. Sequential upshifts, under load, can be done from first to sixth gear speed I–VI through an overlap control of load shifting clutches K1, K2, and to downshift sequentially, under load, by an overlap control of load shifting clutches K1, K2.

In the process of shifting to or from a third or fourth gear speed III, IV, the third or fourth gear speed is always chosen to which, or from which, shift under load is performed by an overlap control of load shifting clutches K1, K2. All double upshifts and double downshifts I–III, II–IV, III–V, IV–VI can be done under load by an overlap control of load shifting clutches K1, K2. Intermediate shafts 12, 14 can be placed in effective connection with each other through toothed gear clutches S10, S11, with toothed gear clutch S10 coupling idler gear 40 to intermediate shaft 14, and toothed gear clutch S11 coupling idler gear 40 to intermediate shaft 12. Power is output through first load shifting clutch K1, intermediate shaft 12, toothed gear clutch S11, idler gear 40, and toothed gear clutch S10 to intermediate shaft 14. Power is also output through fixed gears 74 and 36. Moreover, power can be output through second load shifting clutch K2, through intermediate shaft 14, toothed gear clutch S10, idler gear 40, and toothed gear clutch S11 to intermediate shaft 12, and then through fixed gears 70, 72. In particular, this arrangement allows to start with first load shifting clutch K1, with second load shifting clutch K2, or with both load shifting clutches K1, K2 together from first gear speed I, and also from second gear speed II. It is also possible for intermediate shafts 12, 14 to be placed in effective connection with each other with a shifting element, instead of with two toothed gear clutches S10, S11.

When starting from first gear speed I with both load shifting clutches K1, K2, both load shifting clutches K1, K2 are closed. Toothed gear clutch S10 couples idler gear 40 to intermediate shaft 14, and toothed gear clutch S11 couples 20; idler gear 40 to intermediate shaft 12. Moreover, toothed gear clutch S9 couples idler gear 76 to driven shaft 18. The power flow runs from input shaft 12 through first load shifting clutch K1, intermediate shaft 12, fixed gear 70, idler gear 76, toothed gear clutch S9, driven shaft 18, and through fixed gear 130 to differential 20. Power also flows from input shaft 10 through second load shifting clutch K2, intermediate shaft 14, toothed gear clutch S10, idler gear 40, toothed gear clutch S11, intermediate shaft 12, fixed gear 70, idler gear 76, toothed gear clutch S9, driven shaft 18 and through fixed gear 130 to differential 20. If the difference in rotational speeds in load shifting clutches K1, K2 drops to zero, load shifting clutch K2 is opened.

When starting is performed solely with the second load shifting clutch K2, from first gear speed I, shifting into second gear speed II can be done by transfer to load shifting clutch K1 without interruption of output power, or directly with interruption of output power. Correspondingly, starting can be done from second gear speed II.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A toothed gear transmission with an input shaft connected to a differential by a first and a second partial transmission disposed parallel to each other, comprising:
   two frictionally engaged load shifting clutches coupled respectively to the first and second partial transmissions;
   two intermediate shafts disposed concentrically to each other and coaxially to the input shaft, each of the intermediate shafts being connectable to the input shaft through one of the load shifting clutches;
   at least one toothed gear on each of the two intermediate shafts, the at least one toothed gear being connectable with a first driven shaft disposed parallel to the two intermediate shafts, said first driven shaft providing power to a differential; and
   a second driven shaft, parallel to the first driven shaft, having an axis distance between said second driven shaft and one of the two intermediate shafts and the differential that is unequal from a second axis distance between the first driven shaft and one of the two intermediate shafts and the differential;
   wherein one of the at least one toothed gear on each of the two intermediate shafts meshes with a corresponding toothed gear disposed on the first driven shaft and with a toothed gear disposed on the second driven shafts.

2. The toothed gear transmission in accordance with claim 1, wherein one toothed gear of each intermediate shaft meshes with one toothed gear disposed on the first driven shaft and with one toothed gear disposed on the second driven shaft.

3. The toothed gear transmission in accordance with claim 1, wherein a first and a second gear speeds are commonly placed on one of the first and second driven shafts.

4. The toothed gear transmission in accordance with claim 1, wherein a first toothed gear plane is allocated to a second and a fourth gear speeds, and a second toothed gear plane is allocated to a third and a sixth gear speeds.

5. The toothed gear transmission in accordance with claim 4, wherein the second driven shaft is allocated to the fourth, a fifth, and the sixth gear speed, and the first driven shaft is allocated to a first, the second, the third and a reverse gear speed,
   wherein the second toothed gear plane, a toothed gear plane for a first gear speed, and the first toothed gear plane each comprise one toothed gear disposed on one of the two intermediate shafts, and wherein
   the first toothed gear plane, a toothed gear plane for the fifth gear speed, and a toothed gear plane for the reverse gear speed each comprise one toothed gear disposed on another of the two intermediate shafts.

6. The toothed gear transmission in accordance with claim 4, wherein two toothed gears are disposed on each of the two intermediate shafts.

7. The toothed gear transmission in accordance with claim 6, wherein the first driven shaft is allocated to the second, the third, and the fifth gear speeds and to the reverse gear speed, and the second driven shaft is allocated to the first, the fourth, and the sixth gear speeds, each toothed gear plane comprising one toothed gear disposed on one of the two intermediate shafts.

8. The toothed gear transmission in accordance with claim 1, wherein at least one toothed gear disposed on at least one of the two intermediate shafts is connectable with one of the load shifting clutches.

9. The toothed gear transmission in accordance with claim 8, wherein one of the two intermediate shafts is connectable with another of the two intermediate shafts through shifting elements.

10. The toothed gear transmission in accordance with claim 9, further comprising a toothed gear allocated to a first gear speed connectable with the two load shifting clutches.

11. The toothed gear transmission in accordance with claim 10, wherein a first and a second of the two load shifting clutches are usable individually or jointly for starting from the first gear speed.

12. The toothed gear transmission in accordance with claim 1, further comprising a toothed gear plane allocated to a third and a fourth gear speed, and one toothed gear disposed in the toothed gear plane, said toothed gear being supported on one of the two intermediate shafts and being connectable with the two load shifting clutches.

13. The toothed gear transmission in accordance with claim 12, wherein one of the second driven shafts is allocated to a first, a second, a fourth, and a sixth gear speeds,
   wherein the first driven shaft is allocated to a third, a fourth, a fifth and a reverse gear speed, and
   wherein toothed gear planes comprise one toothed gear disposed on one of the two intermediate shafts.

* * * * *